Jan. 4, 1938.  R. G. BOWER  2,104,007
POWER OPERATED TYPEWRITER
Filed April 28, 1933   11 Sheets-Sheet 1

INVENTOR
Raymond G. Bower
BY
Rector, Hibben, Davis, & Macauley
ATTORNEYS

Jan. 4, 1938.　　　R. G. BOWER　　　2,104,007
POWER OPERATED TYPEWRITER
Filed April 28, 1933　　11 Sheets-Sheet 2

INVENTOR
Raymond G. Bower
BY
Rector, Hibben, Davis, & Macauley
ATTORNEYS

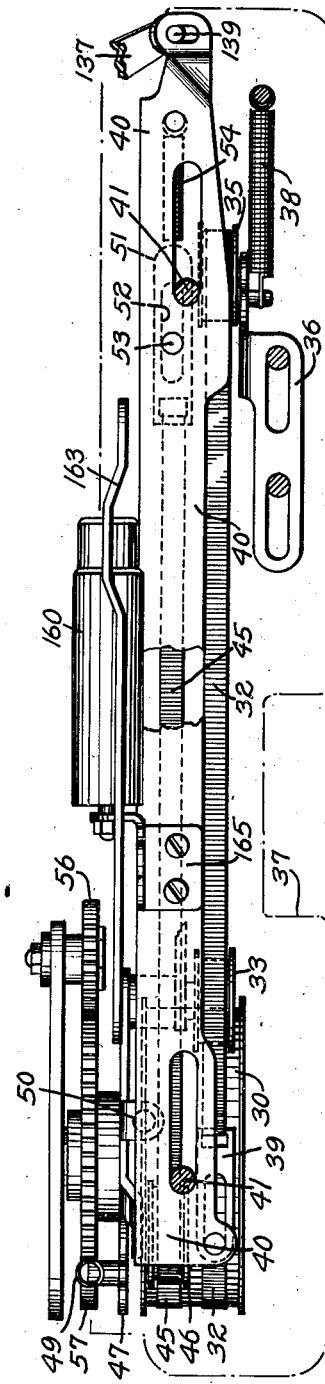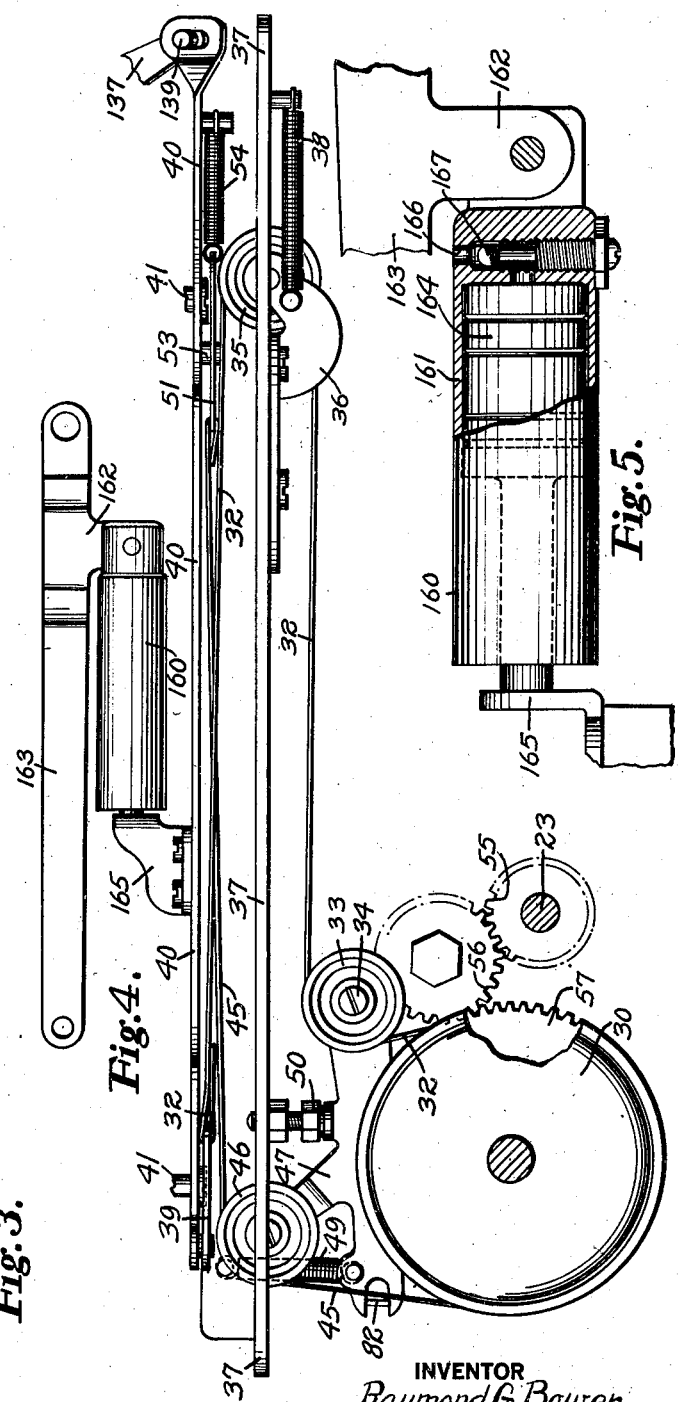
Jan. 4, 1938.   R. G. BOWER   2,104,007
POWER OPERATED TYPEWRITER
Filed April 28, 1933   11 Sheets-Sheet 3
Fig. 3.   Fig. 4.   Fig. 5.
INVENTOR
Raymond G. Bower
BY
ATTORNEYS

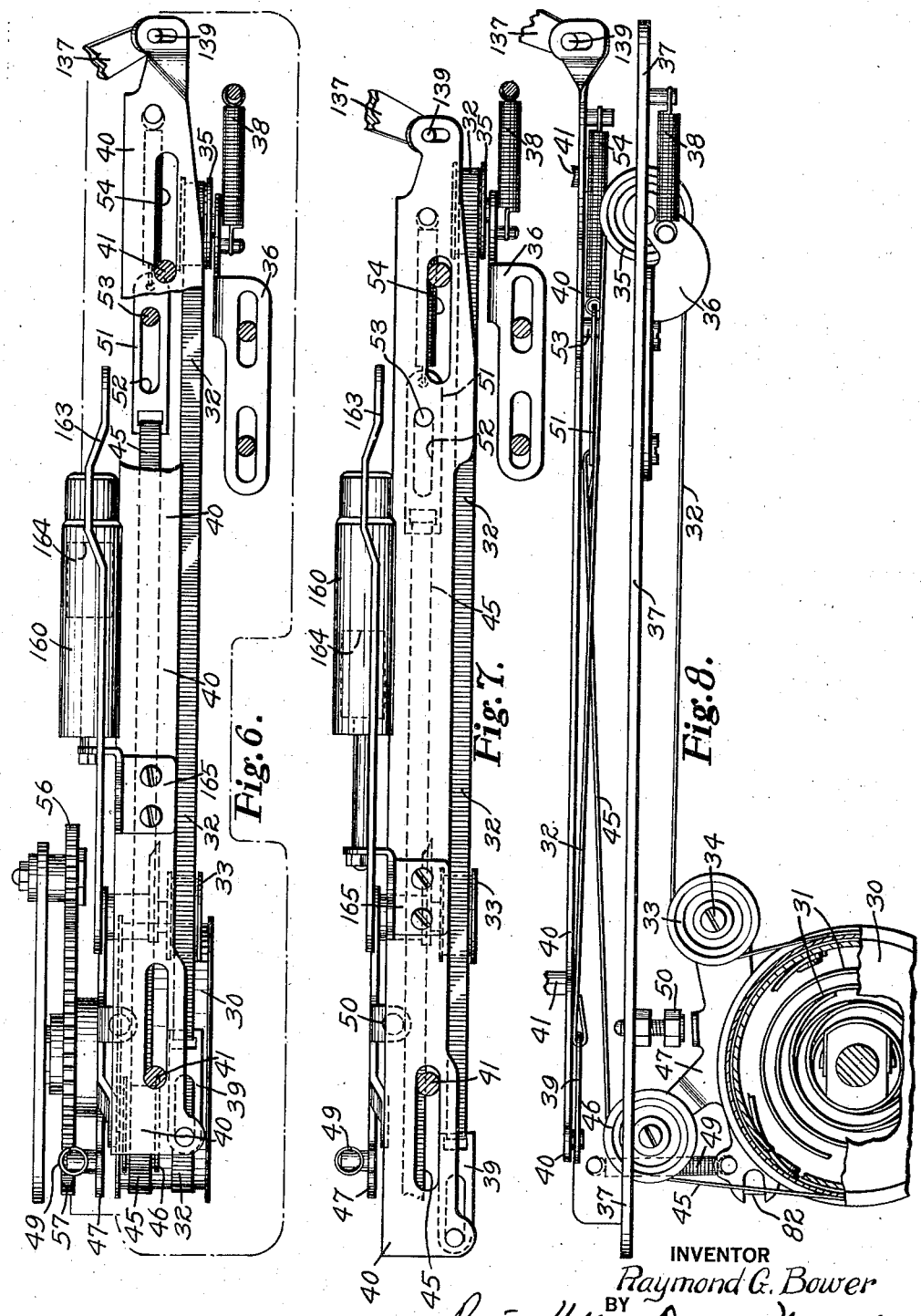

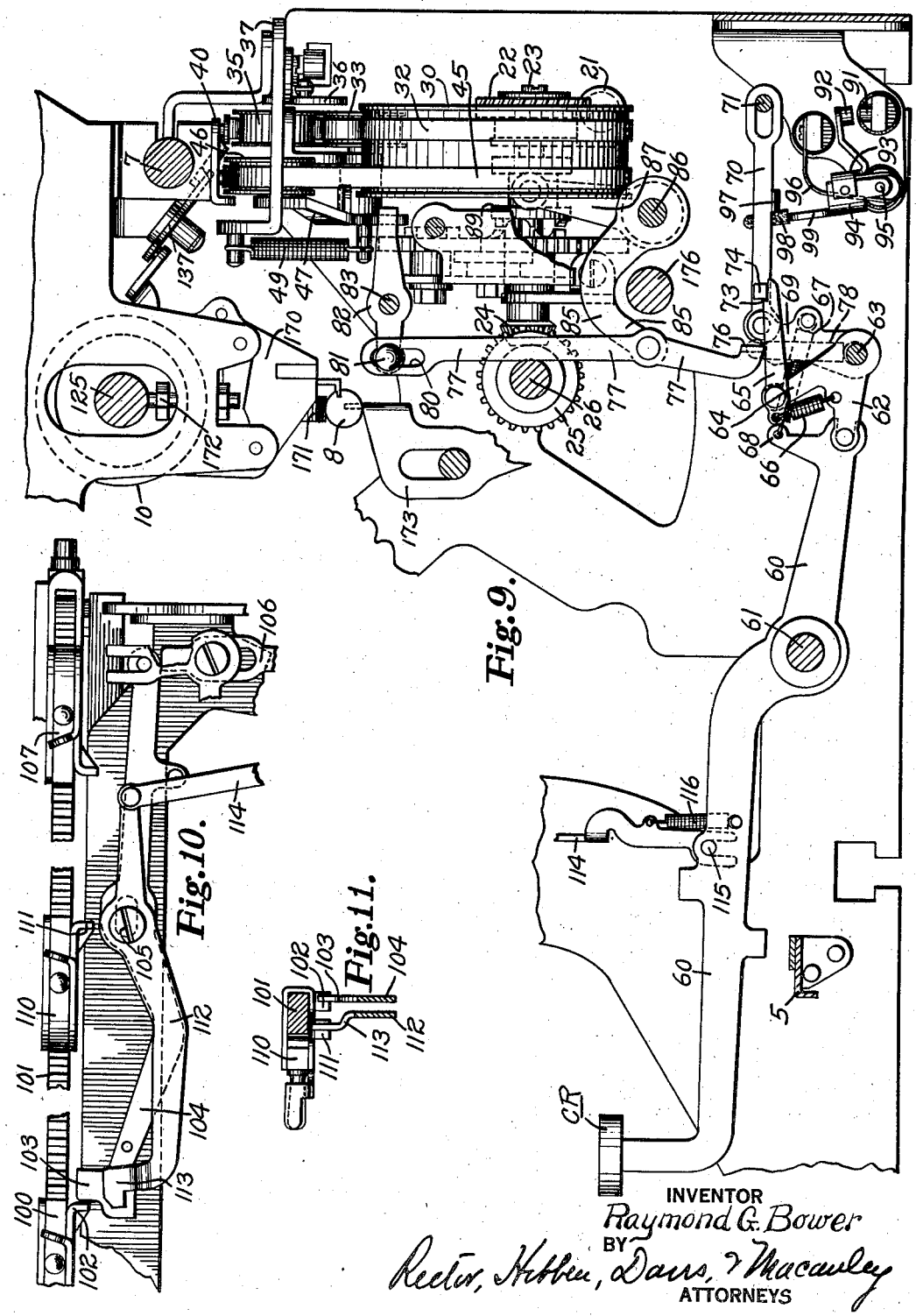

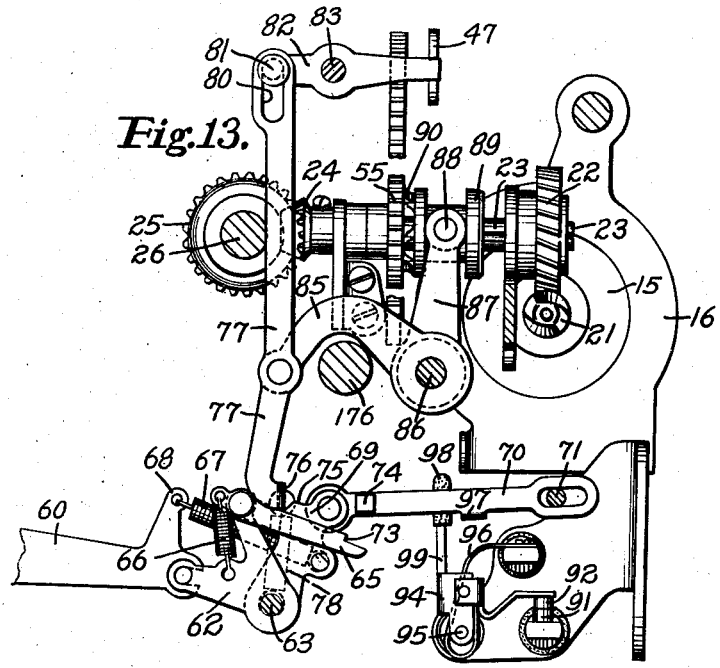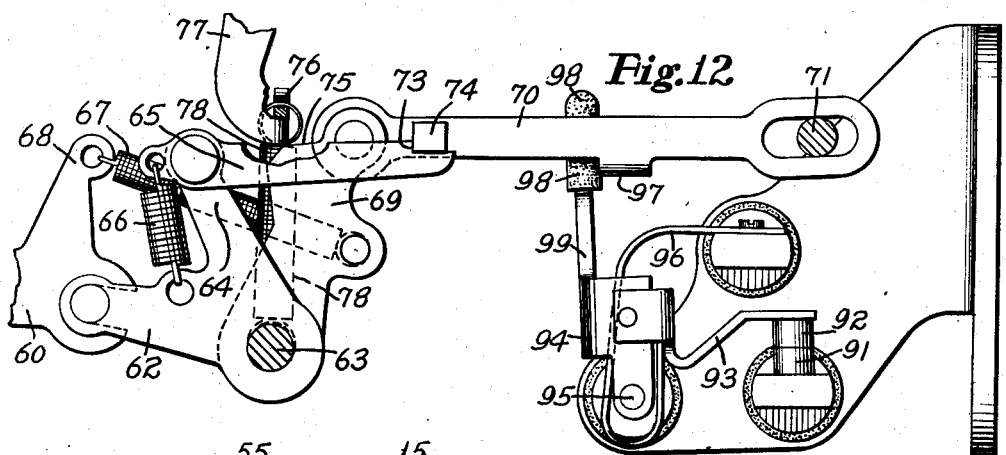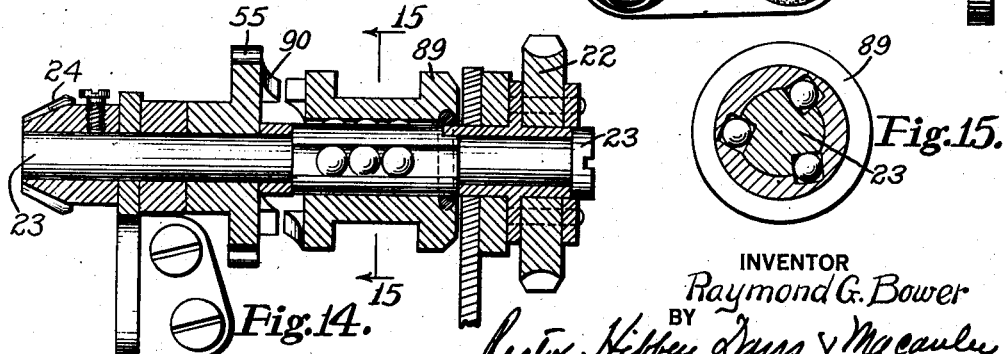

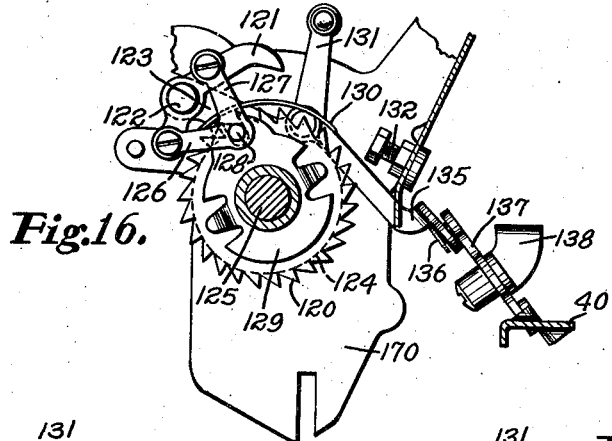
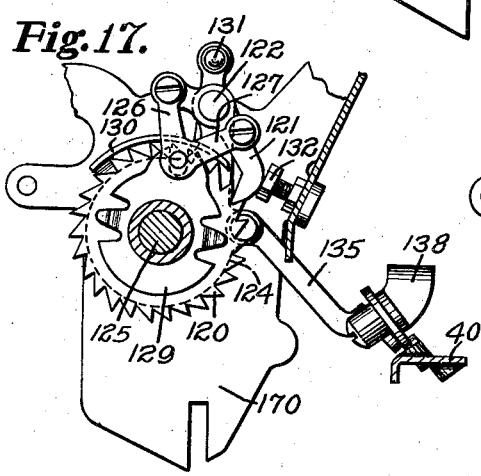
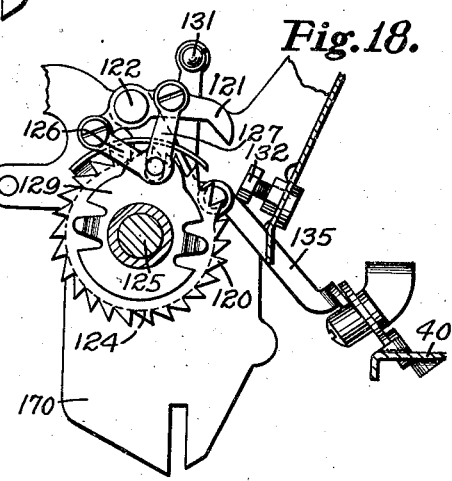
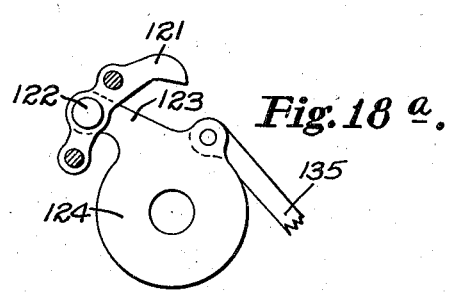

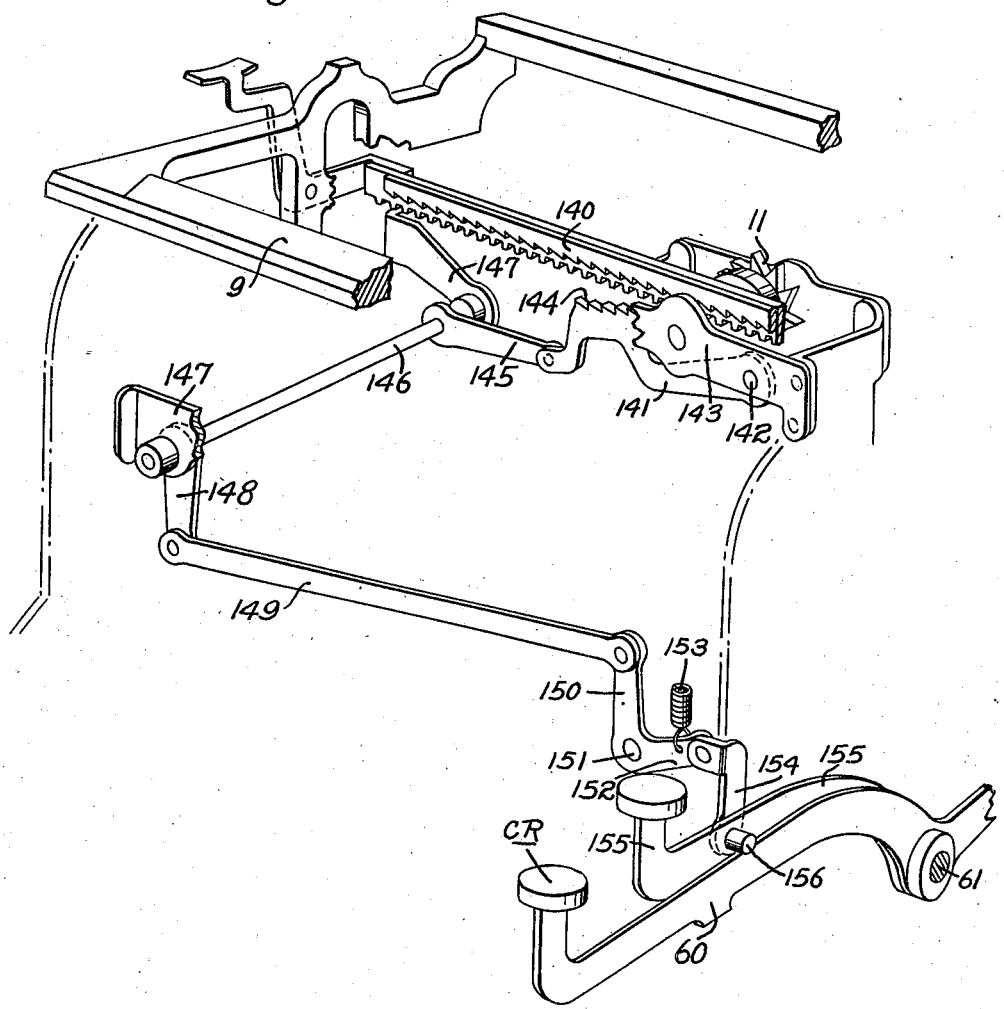

Jan. 4, 1938.  R. G. BOWER  2,104,007
POWER OPERATED TYPEWRITER
Filed April 28, 1933   11 Sheets-Sheet 9
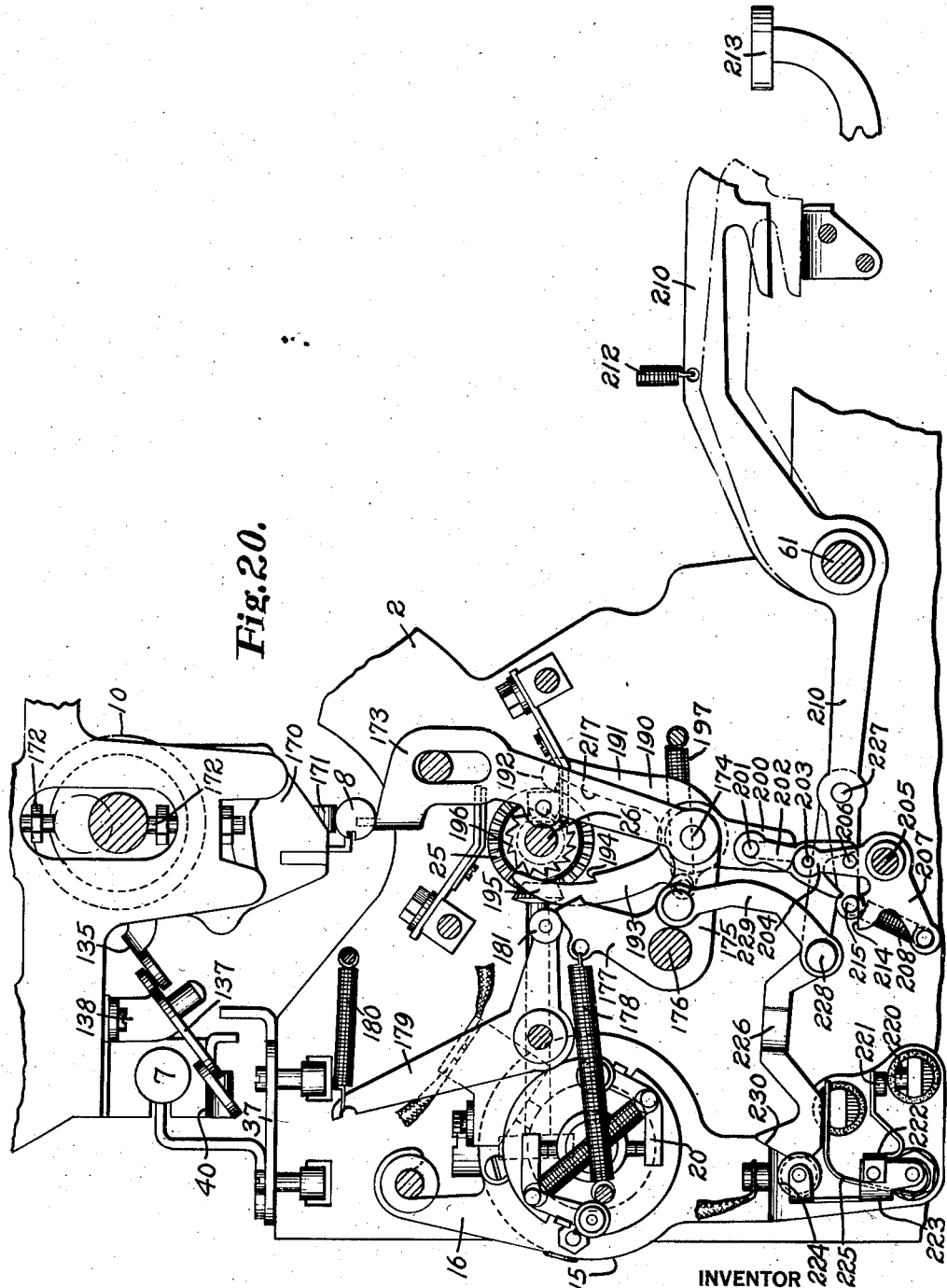
INVENTOR
Raymond G. Bower
BY
ATTORNEYS Jan. 4, 1938.  R. G. BOWER  2,104,007
POWER OPERATED TYPEWRITER
Filed April 28, 1933   11 Sheets-Sheet 10
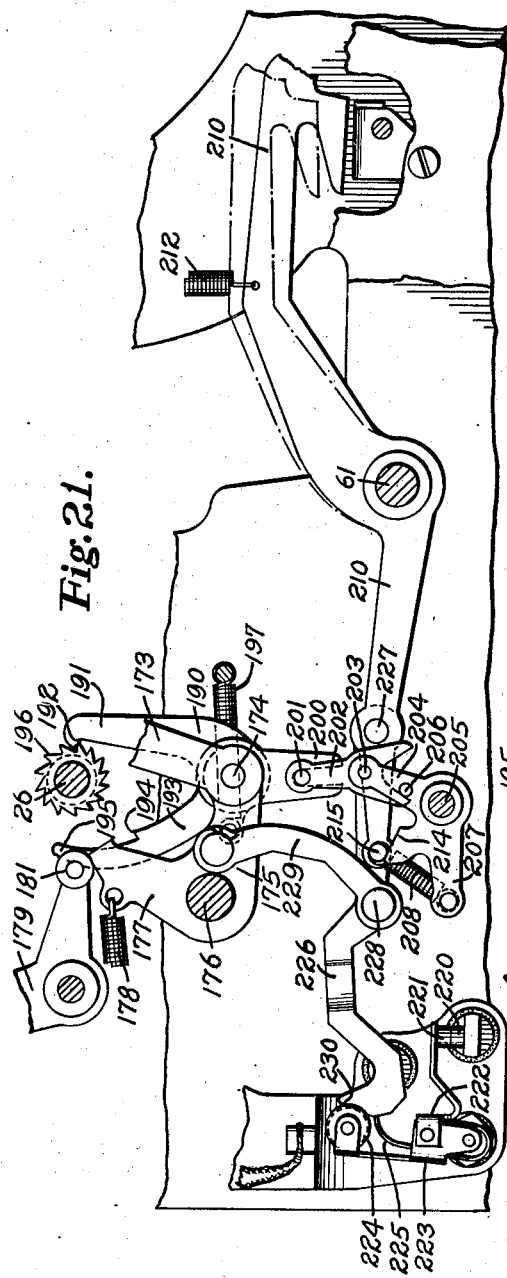
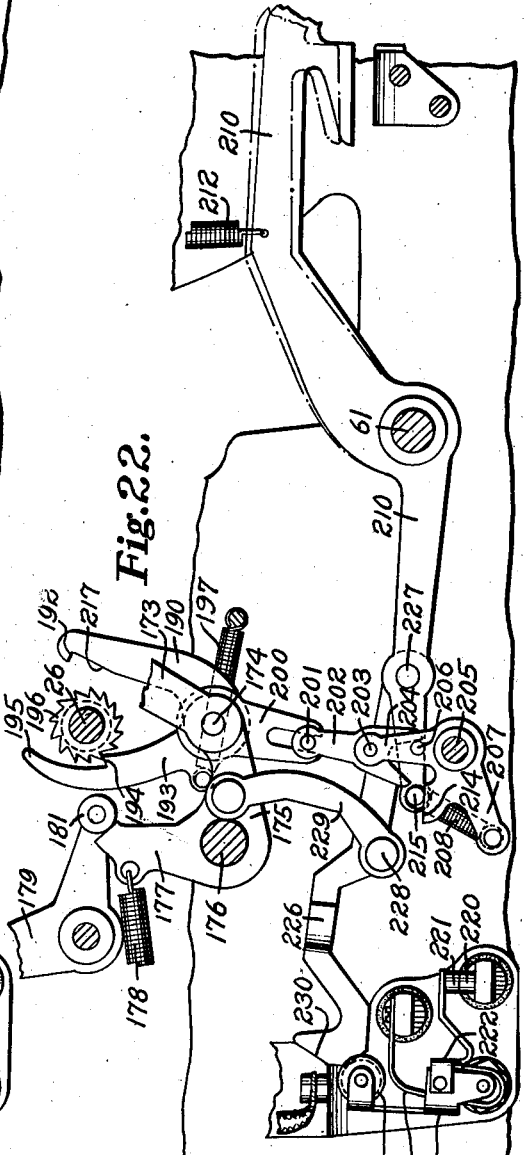
INVENTOR
*Raymond G. Bower*
BY
*Rector, Hibben, Davis, & Macauley*
ATTORNEYS

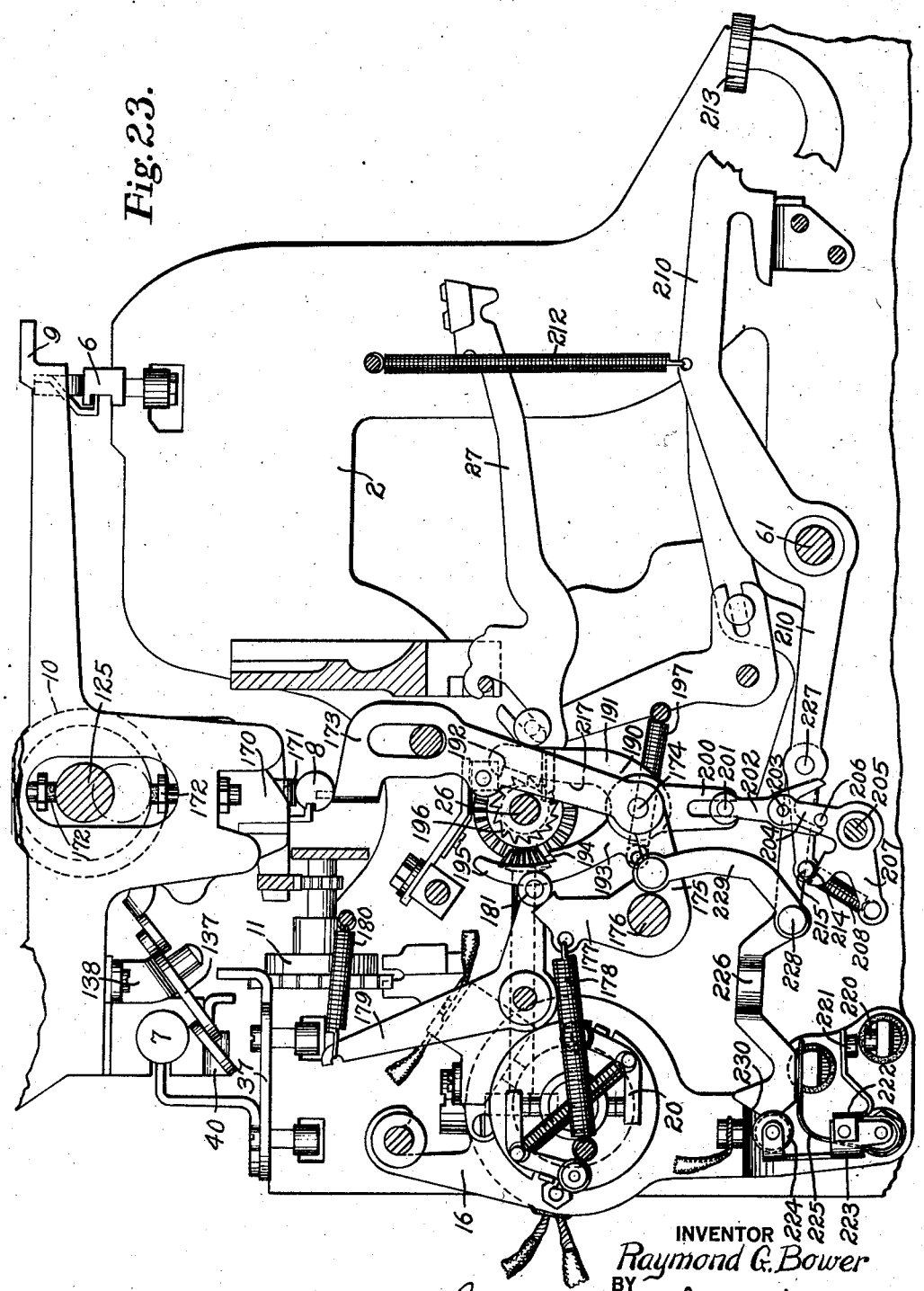

Patented Jan. 4, 1938

2,104,007

UNITED STATES PATENT OFFICE 2,104,007

POWER OPERATED TYPEWRITER

Raymond G. Bower, Detroit, Mich., assignor to Burroughs Adding Machine Company, Detroit, Mich., a corporation of Michigan Application April 28, 1933, Serial No. 668,347

22 Claims. (Cl. 197—66)

This invention relates to a power operated typewriter. It is directed particularly to power operated paper handling equipment for such a machine but it also concerns the general construction and arrangement of parts that enables all the mechanism of a power operated typewriter including the motor to be enclosed within a casing of the size of a standard typewriter.

The general object of the invention is to provide an improved power operated typewriter.

A more particular object is to provide an improved power operated typewriter wherein all the mechanism, including the motor, is housed within a casing of standard typewriter size.

Another object is to provide an improved power operated carriage return for a typewriter.

A further object is to provide improved power operated line spacing mechanism for a typewriter.

A still further object is to provide an improved power operated case shift mechanism for a typewriter.

Still another object is to provide an improved power operated back spacing mechanism for a typewriter.

Other objects and advantages of the invention will appear from the following specification and drawings.

An embodiment of the invention is shown in the accompanying drawings in which:

Fig. 3 is a partial plan view of certain of the carriage return connections, the parts being shown in normal position.

Fig. 4 is a rear elevation of the parts shown in Fig. 3.

Fig. 5 is a detail elevation and section of a dash pot used in connection with the carriage return.

Fig. 6 is a view similar to Fig. 3 with the parts shown in the position they occupy after the motor return clutch has been engaged to return the carriage and after certain of the parts have been moved, as will later appear.

Fig. 7 is another view similar to Fig. 6 with the parts moved slightly farther than in Fig. 6.

Fig. 8 is a rear elevation of the parts shown in Figs. 6 and 7 illustrating the position of the parts when the carriage has been stopped after having been returned across the machine or into engagement with the stops that arrest it and just before the carriage return clutch is released.

Fig. 9 is a partial right side elevation and section showing the carriage return key and its connections, the parts being shown in normal position.

Fig. 10 is a partial front elevation showing the margin stops and associated mechanism for limiting the movement of the carriage.

Fig. 11 is a partial elevation and section showing certain details of the margin stops.

Fig. 12 is a partial right side elevation of the carriage return controls showing the parts in the position they occupy after the carriage return key has been partially depressed.

Fig. 13 is a view similar to Fig. 9 showing the parts in the position they occupy after the carriage return key has been fully depressed and the carriage return clutch engaged to return the carriage.

Fig. 14 is a sectional view of the carriage return clutch.

Fig. 15 is a cross-section on the line 15—15 of Fig. 14.

Fig. 16 is a partial side elevation and section of portions of the line spacing mechanism showing the parts in normal position.

Fig. 17 is a view similar to Fig. 16 showing the parts in the position they occupy after the line spacing mechanism has been operated to line space the platen.

Fig. 18 is a view similar to Fig. 16 with the parts in the position they occupy as the line spacing mechanism is being returned to normal.

Fig. 18a is a detail view of a portion of the line spacing mechanism.

Fig. 19 is a perspective view showing a modified form of control for the carriage return mechanism.

Fig. 20 is a partial left side elevation of the power case shift mechanism, the parts being shown in normal or lower case position.

Fig. 21 is a partial left side elevation of the case shift mechanism showing the parts in the position they occupy with the shift key partially depressed, but before the platen has been raised to upper case position.

Fig. 22 is a partial left side elevation of the case shift mechanism with the parts in the position they occupy after the case shift key has moved a slight distance toward its normal position after having been released, the platen being in its upper case position.

Fig. 23 is a view similar to Fig. 20 with the platen in its upper case position.

General features

Figure 1:
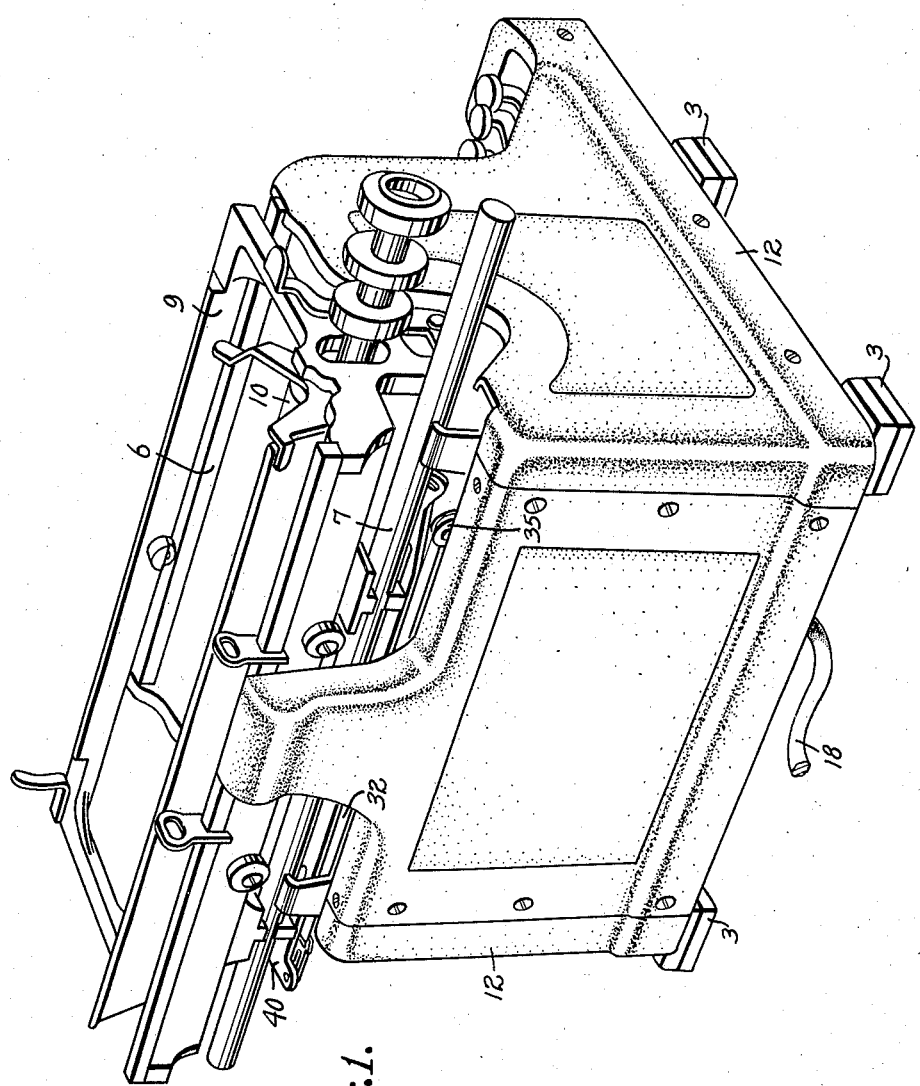
Figure 1 is a perspective view of the typewriter showing how all the parts are included in a casing of size corresponding to a standard size typewriter.

The operating parts of the machine are mounted on, and mostly between, two sheet metal side plates 1 and 2 which carry supporting feet 3. The plates are connected together by various cross bars and shafts which not only space the side plates apart but which also support various portions of the operating mechanism. All these cross bars and shafts have not been illustrated but the ends of certain shafts such as the shafts 61 and 176 in Fig. 9 and the end of one of the cross bars 5 (Fig. 9) have been shown. The others have been omitted to avoid confusing the drawings. The side plates support a front carriage rail 6 (Fig. 2), a rear rail 7, and a case shift rail 8 that is movable up and down for case shifting as will be explained later. Mounted to travel laterally on these rails is a paper carriage designated generally as 9 supporting a rotatable platen 10 (Fig. 9), which carriage is arranged to move to the left, as viewed from the front of the machine, under the control of suitable escapement mechanism 11, parts of which are shown in Fig. 19.

The side plates and the mechanism of the machine are, after the machine has been assembled, enclosed in a nicely finished housing 12 (Fig. 1) which is made up of a plurality of side and end plates that are attached to the side plates so as to fully enclose the working parts, except for those that must be exposed for manipulation. This gives the machine a very neat and attractive appearance as will be apparent from Fig. 1. It also protects the working parts against dirt and moisture. The details of the casing are described in a co-pending application and will not be further referred to here.

Motor drive

The machine is driven by a very small electric motor 15 mounted between two side plates 16 supported on a cross piece 17 (Fig. 2) that extends between the two main side plates 1 and 2 of the machine. The leads 18 for the motor are brought in at the rear of the machine (Fig. 1) and a suitable time fuse 19 is provided for protecting the motor. This motor is preferably a series motor and a speed governor 20 (Fig. 2) is attached to one end of it to govern its speed. The armature of the motor is connected to a worm 21 that drives a worm wheel 22 fixed to a shaft 23 that also has a beveled gear 24 attached to it (Fig. 9). The gear 24 meshes with a second beveled gear 25 fixed to a cross shaft 26. When the motor is running, the cross shaft 26 is rotated counter-clockwise, as viewed in Fig. 2, and the rotation of this shaft is utilized to drive various parts of the machine including the case shift and the line spacing mechanism. Other connections are provided for returning the carriage, as will later appear. Power from this shaft can also be used to drive the type bars, of which one is shown at 27 in Fig. 23, but this mechanism has not been illustrated as it forms the subject matter of another application.

An important point to be noted is that the motor and the operating parts are included within the casing or housing 12 and that the size of this housing corresponds to the size of standard typewriters on the market. There are no bulges or auxiliary casings and there is no motor on the back, at the side of, or below the machine.

As far as known, this is the first time that this has ever been accomplished. Power drives for typewriters have heretofore been devised and there has been great pressure for a compact machine but, heretofore, the placing of the motor on the side of, or to the rear of the typewriter, or below it, has been considered a necessary evil, or the typewriter has been made so big and bulky as to be quite clumsy and very distinct as compared with a standard machine. The problem of getting all the parts in a standard sized casing, with a motor that must remain cool also included, has been a difficult one.

Carriage return mechanism

The paper carriage is urged to the left, as viewed from the front of the machine, or to the right as viewed in Fig. 2, by a spring and it is returned in the opposite direction by power, as will now be explained.

Figure 2:
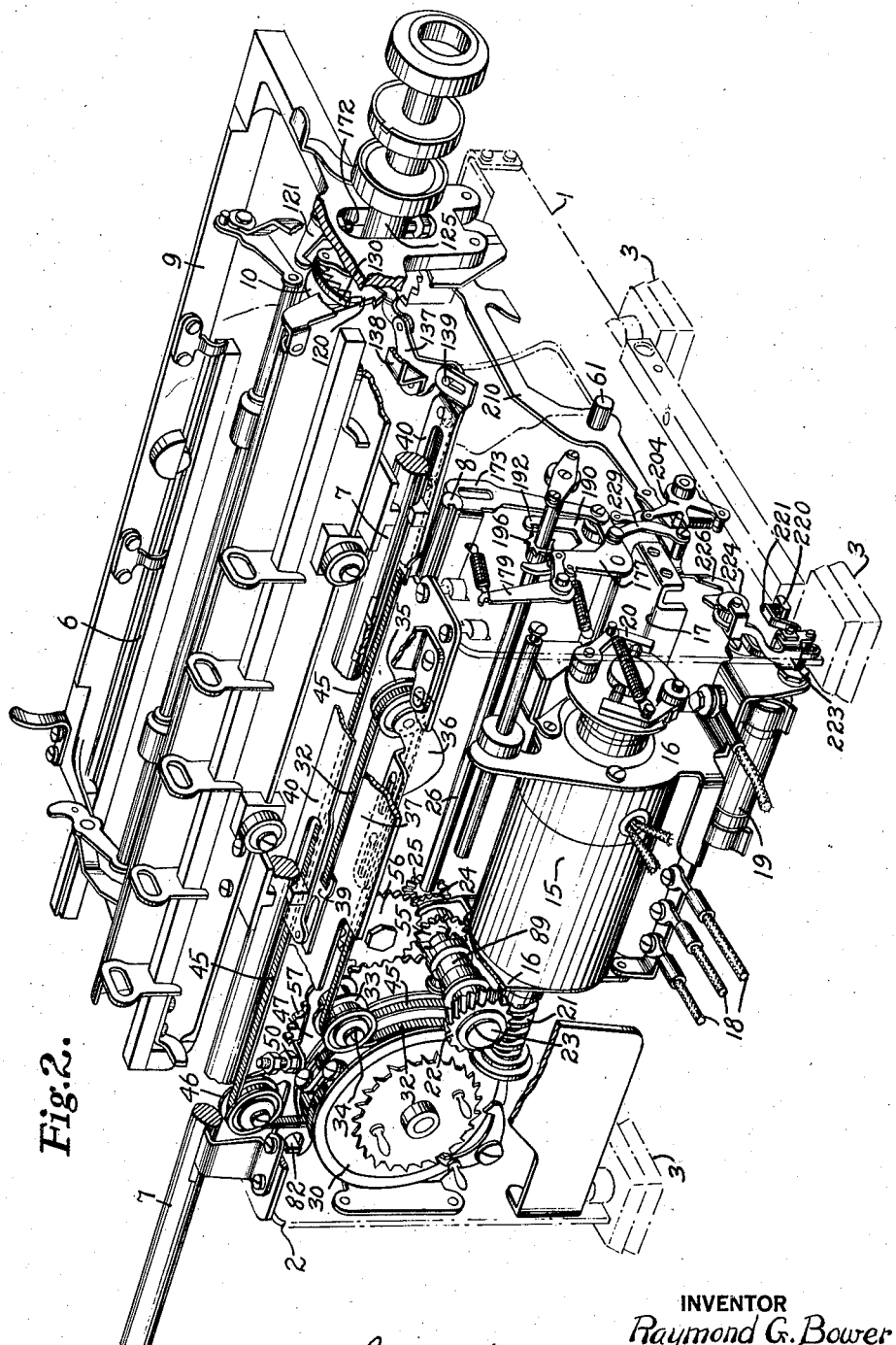
Fig. 2 is a perspective view of the typewriter from the rear with the casing removed.

For urging the carriage to the right, in Fig. 2, a spring drum 30 is provided which has a spring 31 (Fig. 8) that tends to turn the drum clockwise, as viewed in said Fig. 2. Removably connected to this drum is a tape 32 which passes over a grooved pulley 33 rotatably mounted on a stationary stud 34. The tape continues to the right and then passes around a second grooved pulley 35 rotatably mounted on a slide plate 36. The slide plate 36 is mounted by stud and slot connections on a stationary plate 37 and urged to the right (Fig. 4) by a spring 38. The tape 32 then passes to the left (Fig. 2) and its end is connected to a hook 39 which, in turn, is releasably connected to a plate 40 slidably mounted on the paper carriage. The slide plate 40 is mounted to slide on studs 41 (Figs. 6 and 7) and it is normally maintained in its right-hand position, as shown in Figs. 2, 3, and 4, by the tension of the spring drum 30 pulling on the tape 32.

The carriage is returned, or moved to the left, as viewed in Fig. 2, by means of a second tape 45 wound on the drum 30 in the opposite direction to the tape 32. This second tape 45 passes over a grooved pulley 46 carried by an arm 47 pivoted on the stud 34 and is urged clockwise, as viewed in Fig. 4, by a spring 49 against an adjustable limit stop 50. The tape 45 then extends to the right, as illustrated in Fig. 4, and its end is connected to a metal plate or link 51 (Fig. 3). The link 51 has a slot 52 which enables the link to be slidably connected to a stud 53 on the slide plate 40. The link 51 is also connected to the slide plate 40 by a spring 54 which urges the link to the right in Fig. 3. The purpose of these two connections will presently appear.

When the carriage is moved to the right in Fig. 4 under the influence of the spring drum 30, the tape 32 winds on the drum and the tape 45 unwinds. The diameter on which these tapes are winding and unwinding continuously varies so that they travel at slightly different speeds which would cause the unwinding tape to become loose under certain conditions. It is desirable to maintain the unwinding tape taut. Normally the tape 45 and the link 51 occupy the position illustrated in Fig. 3 where it will be observed that the stud 53 is in approximately a central position between the ends of the slot 52. The spring 54 is maintaining a tension on the tape 45 tending to pull it to the right. Accordingly, if the tape 45 tends to loosen, the spring 54 will take up the slack and keep it taut, the amount of movement allowed link 51 relative to slide 40 being sufficient to take care of all looseness that ordinarily occurs.

In order to return the carriage to the left (Fig.

2) the drum 30 must be rotated counterclockwise, as viewed in Figs. 2 and 4, and for this purpose, the drum is connected to the motor 15 by connections as follows:

Mounted to rotate loosely on the shaft 23 is a gear 55 (Fig. 4) which is adapted to be clutched to the shaft by a clutch that will be described later. Gear 55 meshes with a second gear 56 that, in turn, meshes with teeth on a gear 57 fixed to the shaft of spring drum 30. As the motor operates, it acts, through a clutch described later, to rotate the gear 55 counterclockwise (Fig. 4) and, through the train of gearing above mentioned, drives the spring drum 30 counterclockwise to wind the tape 45 on the drum.

As the drum 30 is rotated counterclockwise by the motor it exerts a pull on the tape 45 and the first result is to move the link 51 against the tension of its spring 54 from its Fig. 3 to its Fig. 6 position, that is, until the stud 53 contacts the end of the slot 52. When the end of slot 52 engages stud 53 the connection between the tape 45 and the slide plate 40 becomes a positive one and the tape exerts a pull on the slide plate to move it to the left. The slide plate is then moved to the left from the position of Fig. 6 to that of Fig. 7. After the slide 40 reaches its Fig. 7 position it is limited against movement relative to the carriage, as will be described later, with the result that the tape 45 then pulls the carriage to the left.

As the carriage moves to the left, the tape 32 is unwound from the drum. If this tape should tend to become loose its slack is taken up by the influence of spring 38 on the slide 36 which pulls the pulley 35 to the right, as viewed in Figs. 6 and 7, the slide 36 being shown in a moved position in Fig. 7 as related to Fig. 6.

It is to be observed that provision is thus made for maintaining both tapes 32 and 45 taut while they are unwinding and this takes place without interfering with the efficient operation of either tape when it is called upon to pull the carriage.

When the drum 30 is being driven counterclockwise by the motor 15 it retensions the spring 31 by power, as will be readily understood.

*Controls for initiating carriage return*

The carriage is started on its return movement by depressing a carriage return key which, in the embodiment of the invention illustrated, starts the motor and throws in the clutch to drive the drum 30 counterclockwise to return the carriage.

The carriage return key is of the depressible type, and it will hereinafter be referred to as a depressible key, but it is to be understood that this term includes a key or member that can be pushed or pulled or otherwise manipulated.

Referring to Fig. 9, the carriage return key CR is mounted on the end of a lever 60 pivoted on a shaft 61. The rear end of this lever is pivoted to one arm 62 of a bell crank lever pivoted on the shaft 63 and having another arm 64 carrying a pawl 65 on its end, which pawl is urged counterclockwise, as viewed in Fig. 9, by a spring 66. The lever 60 carrying the carriage return key is urged clockwise, as viewed in Fig. 9, by a spring 67 which is connected to a projection 68 on the rear end of lever 60 and to an arm 69 loosely mounted on shaft 63 and pivoted to a link 70 having a slot in its rear end engaging over a stud 71 on the right side frame 2 of the machine. With the link 70 limited against stud 71, as in Fig. 9, the arm 69 is limited and the tension of spring 67 tends to rock lever 60 clockwise to normal position.

The pawl 65 has a shoulder 73 on it adapted to engage a square stud 74 on link 70. When the carriage return key is depressed, bell crank 62—64 is rocked clockwise and pawl 65 pushes the link 70 rearward for purposes that will presently appear.

The arm 69 has a ledge 75 on it (Fig. 12) and normally resting on this ledge is a lateral lug 76 on the lower end of a link 77 that is urged downward by a spring 78. The upper end of link 77 has a slot 80 in it which is positioned over a stud 81 on one end of a lever 82 pivoted at 83 to the side plate 2 of the machine. The function of lever 82 will be explained later. It is sufficient for present purposes to note that the link 77 normally occupies the position shown in Fig. 9 with the stud 81 in an intermediate position in the slot 80 so that the link can move downwardly relative to the lever 82.

The link 77 controls a carriage return clutch through an arm 85 pivoted at one end to the link 77 and fixed at its other end to a shaft 86. Fixed to the shaft 86 is an arm 87 carrying a stud 88 that operates in a groove in a sliding clutch member 89 that rotates with and slides on the drive shaft 23, a suitable anti-friction mounting being provided as shown in Figs. 14 and 15. One end of clutch member 89 is provided with teeth adapted to engage the corresponding teeth 90 on the side face of the gear 55 which is loosely mounted on the shaft 23 and which is geared to the spring drum 30.

When the parts occupy the position shown in Fig. 9, the teeth of clutch member 89 are separated from those of gear 55 and the clutch is disconnected or disengaged.

When the carriage return key CR is depressed, the lever 60 is rocked counterclockwise and pawl 65 pushes link 70 rearward as previously explained. This moves the arm 69 clockwise (Fig. 9) and the ledge 75 (Fig. 12) moves from under the lug 76. This frees the link 77 which is thereupon drawn downwardly by its spring 78 from the position of Fig. 9 to that of Fig. 13. The downward movement of the link 77 rocks the arm 85 counterclockwise to its Fig. 13 position and the arm 87 is moved correspondingly. This slides the clutch member 89 to the left, as viewed in Fig. 9, and engages the clutch, as shown in Fig. 13. The gear 55 is thereby connected to the drive shaft 23 and the spring drum 30 is rotated by the motor to pull on tape 45 to return the carriage.

The above described clutch mechanism is operable to connect the carriage return mechanism to the motor drive shaft no matter how it is rotated but, in the embodiment illustrated, it is preferred to use a normally inactive motor, hence provision must be made for starting the motor at the time the clutch is engaged. The motor controls are also governed by the carriage return key.

A switch is provided in the motor circuit comprising a stationary contact 91 and a movable contact 92, the latter being carried by a yoke-like member 93 attached to a second yoke 94 pivoted at 95. The two yokes are urged clockwise (Fig. 9) by a spring 96 to thus urge the switch toward closed position. The details of this switch are disclosed in Patent No. 1,908,881. The switch is normally held open by a lug 97 on the link 70 which engages the insulated end 98 of an arm 99 on the yoke member 94. As long as the link 70 occupies the position illustrated in Fig. 9, the switch is held open but when link 70 is moved rearwardly to its Fig. 12 position upon depression of the carriage return key, the arm 99 is freed and the spring 96 immediately closes the switch and starts the motor.

It will be seen, therefore, that when the carriage return key is depressed, the motor is started and the clutch is engaged to cause the carriage to be moved to the left by power.

When the link 77 moves downward under the influence of its spring 78, upon depression of the carriage return key, the lug 76 moves in front of arm 69 to hold the arm in its rear position, as shown in Fig. 13, the arm 69 being provided with an inclined edge to facilitate this action. The lug 76 also strikes pawl 65 and disengages it from stud 74, as shown in Fig. 13. If the carriage return key is released it is free to be returned to normal by spring 67 but a second depression of it will not be effective until the clutch 89—55 is disengaged by the return of link 77 because pawl 65 is held in the idle position of Fig. 13 as long as link 77 is in its lower position. The release of the carriage return key and its return to normal does not open the motor switch because link 70 is held in its rear position as long as link 77 is in its lower position.

*Automatic disconnection of motor drive*

After the carriage has been returned to the left, it is necessary to disconnect the motor drive to arrest the carriage in proper position. A novel mechanism has been provided for this purpose which has numerous unexpected advantages.

The carriage is arrested by adjustable margin stops which are best illustrated in Figs. 10 and 11. The margin stop 100 at the left end of the carriage rail 101 (Fig. 10), viewing the machine from the front, arrests the carriage at the desired limit of movement to the right, as viewed from the front of the machine. As the carriage moves to the right, a downwardly projecting lug 102 of the stop 100 engages a projection 103 on a lever 104 pivoted on stud 105 and the carriage is arrested. The carriage may be released again, if desired, by depressing a margin release key, not shown, which raises a link 106 (Fig. 10) and rocks the lever 104 counterclockwise to lower projection 103 below lug 102.

The margin stop 100 is the stop that arrests the carriage upon its normal complete return across the machine. A similar stop 107 arrests the carriage when it is moving in letter space direction under the control of the escapement mechanism.

An understanding of all the details of this margin stop mechanism is not necessary for an understanding of the present invention, it being sufficient to know that such a mechanism is provided which arrests the carriage after it has returned the desired distance.

When the carriage is arrested, the motor continues to pull on the tape 45. The pulley 46 (Fig. 4) over which the tape 45 passes is mounted, as previously explained, on the end of a pivoted lever 47 urged clockwise by a spring 49. This spring is fairly strong but, when the carriage is arrested, the pull of the motor on tape 45 is strong enough to overcome the spring and rock the arm 47 counterclockwise, as viewed in Fig. 8. The end of the arm 47 is bifurcated (Fig. 4) and positioned in this bifurcation is one end of the lever 82 (Figs. 4 and 9) which, as heretofore explained, is connected by a pin and slot connection with the link 77. When the link 77 is lowered upon depression of the carriage return key, the slot 80 in said link moves relative to stud 81 in lever 82. This allows link 77 to move downwardly without disturbing lever 82 and without being restrained by it but, when the link is lowered, it will be observed that the stud 81 is at the upper end of slot 80 (Fig. 13).

When the arm 47 supporting the pulley 46 is rocked counterclockwise, as viewed in Fig. 4, it rocks the lever 82 clockwise, as viewed in Fig. 13. This raises the link 77 and rocks the arms 85 and 87 in a clockwise direction to slide the clutch member 89 to the right to disengage the clutch.

The raising of link 77 also automatically stops the motor. As the link 77 is raised, the lug 76 is moved above the ledge 75 on arm 69 whereupon said arm is rocked counterclockwise by its spring 67 to pull the link 70 to the left, as viewed in Fig. 13. The lug 97 engages the insulated end 98 of arm 99 and opens the switch.

In this manner, when the carriage is arrested by the margin stop 100, the pull of the motor automatically disconnects the clutch and frees the motor switch so that it will be automatically opened to stop the motor.

After the carriage is disconnected from the motor drive, the spring drum acts at once to pull it in the opposite direction. The regular escapement mechanism restrains the carriage, however. The pull of the spring drum 30 on tape 32 pulls slide 40 back to its normal position, however.

An important advantage of this construction is that rebound of the carriage is prevented. The power return brings the carriage against the stop and holds it there so that it will not rebound. Immediately afterwards the power means is disabled which leaves the carriage in its proper position free of the action of the power return.

Another important advantage of this automatic disconnection construction is that the clutch will be automatically disconnected and the motor stopped whenever the carriage is blocked during the return movement no matter what causes the blocking. It might be the operator's finger or hand that had become accidently engaged in the carriage mechanism while the carriage is being returned, or the carriage might be stopped by hitting some obstruction on a desk, or because some part of the mechanism was not operating properly. This means that, if anything goes wrong with the mechanism, or if anything obstructs the return of the carriage or, if the operator gets his fingers in the mechanism, the motor drive will be disabled by the disconnection of the clutch and the stopping of the motor. So far as known, this is the only carriage return that will operate to do this.

In the event the carriage return clutch should fail to release, for any reason, the motor would, of course, be stalled against rotation, in which event the time fuse 19 would burn out within a given period, generally about 20 seconds, which would break the circuit and stop the motor. But the times when the fuse would be necessary are so rare as to be about negligible. It is provided simply to insure absolute safety against burning out the motor under some extraordinary condition that might arise.

*Automatic arrest of carriage at predetermined intermediate position*

It is sometimes desirable to arrest the carriage at intermediate positions short of the full return of the carriage across the machine. Provision is made for doing this as follows:

A special margin stop 110 (Fig. 10) is provided having a downwardly extending lug 111 which is in a different plane than the lugs on the other margin stops, as will be clear by reference to Fig. 11. For cooperation with this special stop 110, there is provided a lever 112 pivoted on stud 105 and having an upstanding end 113 for engaging the lug 111 of the stop. The other end of this lever carries a link 114 whose lower end straddles a stud 115 (Fig. 9) on the lever 60 carrying the carriage return key. The link 114 is connected to the carriage return lever 60 by a spring 116.

Normally the end 113 of lever 112 is below the path of the lug 111 and, of course, this end 113 is out of the path of the regular margin stops 100 and 107 because it is out of the plane of the lugs on these stops, as shown in Fig. 11.

When the carriage return key CR is depressed, the rocking of lever 60 counterclockwise (Fig. 9) pulls link 114 downward and this rocks the lever 112 clockwise (Fig. 10) to position the upstanding end 113 in the path of the lug 111 of stop 110. Then, when the carriage reaches the position where the stop 110 engages the upstanding end 113 of the lever 112 the carriage is arrested and the motor acts to rock the arm 47 (Fig. 4) carrying the pulley 46 downward to disconnect the clutch and stop the motor in the manner previously explained.

The intermediate stop 110 can, of course, be positioned along the carriage rail 101 at any desired point and more than one of these stops can be provided. A convenient arrangement is to have one of these stops arrest the carriage in a position to begin a new paragraph.

When the carriage return key is depressed and held depressed, the lever 60 will hold the lever 112 in position for the upstanding end 113 to engage the lug 111 on the intermediate stop 110 and the carriage will be arrested in its paragraph position.

If, however, the carriage return key is simply depressed and then released, the carriage will return fully across the machine because, as soon as the carriage return key is released, it is returned to its normal position by the spring 67. The return rocking movement of lever 60 moves the link 114 upwardly and the latter swings the lever 112 counterclockwise out of the path of the lug 111 on the intermediate stop. Accordingly, the carriage passes this stop and is arrested by its regular stop 100.

In other words, if the operator wants to return the carriage to a paragraph position, he depresses the carriage return key and holds it depressed. If he wants to return the carriage completely across the machine, he simply depresses the carriage return key and releases it.

To release the carriage for further return movement after it has been arrested by an intermediate or special stop, it is merely necessary to again depress the carriage return key and release it as before. This lowers link 114 and frees the carriage. The depression of the carriage return key starts the motor and engages the clutch in the manner previously explained and the carriage then moves in a return direction until again arrested.

*Automatic line spacing as an incident to the return of the carriage*

Provision is made for automatically line spacing the platen each time the carriage is returned but, before describing the automatic operation, the line spacing mechanism itself, which has some novel features in it, will be explained, reference being had to Figs. 16, 17 and 18.

Attached to the shaft of platen 10 is a toothed ratchet wheel 120. A pawl 121 is provided for engaging this ratchet wheel said pawl being pivoted at 122 on the end of an arm 123 which extends from a disk 124 (Fig. 18a) rotatably mounted on the platen shaft 125. The arms 126 and 127 of a bell crank lever are pivoted to the pawl on opposite sides of the pawl pivot 122, as shown in Figs. 16–18, and this bell crank lever is pivoted at 128 to a friction disk 129 positioned between the ratchet wheel 120 and the platen. This disk may be rotated on the platen shaft but is held by friction with the ratchet wheel 120 so as not to rotate easily.

To line space the platen the arm 123 is moved clockwise from the position of Fig. 16 to that of Fig. 17. As the arm 123 starts to move, the bell crank lever 126—127, being restrained at its pivot 128 by friction disk 129, tends to turn pawl 121 on its pivot 122, the friction disk 129 does not follow the arm 123 immediately. The result is that the nose of the pawl 121 is brought into engagement with the shield 130 which can be adjusted to various positions by a hand lever 131 so as to cause the platen to be line spaced one, two or three spaces. As the arm 123 continues to move it carries the friction disk 129 with it and the pawl drops off the end of the shield 130 into engagement with the ratchet teeth, as shown in Fig. 17. The pawl 121 and the line spacing mechanism are limited by the engagement of the pawl with an adjustable stop 132 (Fig. 17).

The line spacing mechanism is returned to normal by moving the arm 123 back to the position of Fig. 16. As the arm 123 starts to move back, the bell crank 126—127 is retarded at its pivot 128 by friction disk 129 and the bell crank rocks the pawl 121 to the position of Fig. 18, that is, the pawl is moved out of engagement with the ratchet wheel and to a position where it does not engage either the ratchet wheel or the shield during the return movement of the line spacing mechanism. In other words, the pawl is entirely free during its return movement and the objectionable noise of the pawl riding over the ratchet teeth is eliminated. Nevertheless, when the arm 123 is again moved in line space direction, the pawl again comes down to position at the proper time to engage the ratchet teeth to line space the platen.

The line spacing mechanism is operated automatically as an incident to the return of the carriage across the machine by means of a link 135 (Fig. 16) which is connected to the disk 124. The link 135 has a universal connection 136 with one arm of a bell crank lever 137 (Fig. 2) which is pivoted on a bracket 138 on the paper carriage. The other arm of the bell crank lever 137 is connected by a pin and slot connection 139 with the end of the slide 40.

It will be recalled that when the motor pulls on the tape 45 to return the carriage across the machine, the slide 40 is moved to the left as viewed in Fig. 2. The movement of the slide relative to the carriage is limited by the line space pawl 121 limiting against its stop 132 (Fig. 17) and, when this occurs, the tape 45 moves the carriage. The initial movement of this slide 40 rocks the bell crank lever 137 clockwise, as viewed in Fig. 2, and pulls the link 135 to the rear to line space the platen.

When the carriage return is automatically disconnected as heretofore explained and the carriage placed under the tension of the spring drum 30, the slide 40 is returned to the right (Fig. 2) by the pull of the tape 32 with the result that the line space mechanism is returned to normal.

The platen is thus automatically line spaced as an incident to the return of the carriage across the machine and, upon the arrest of the carriage, the line space mechanism is positively returned to normal.

*Power operated line spacing with paper carriage stationary*

Although the platen is automatically line spaced as an incident to the return of the paper carriage across the machine, it is sometimes desirable to line space the platen independently of the carriage return and provision has been made for doing this, as follows:

If, while the carriage is limited in its fully returned position, or, when it is limited against an intermediate stop, the carriage return key is depressed and held for a short time, the motor will be started and the clutch thrown in as if to return the carriage. The slide 40 which operates the line spacing mechanism during the return of the carriage will be operated in the usual way and the line spacing mechanism will be operated. But, since the carriage is blocked against return movement, the clutch will be immediately disconnected and the motor stopped without moving the carriage. But in the meantime, the line spacing mechanism has been operated.

This enables the platen to be line spaced by power when the carriage is in its fully returned position.

It is to be noted also, that the platen can be line spaced when the carriage is in an intermediate returned position, such as a paragraph position. In such position, the carriage return key should be depressed slowly or held down after being depressed. When this is done the intermediate stop 113 is held in position to keep the carriage from moving and the line spacing occurs as above described.

A modified control for enabling the platen to be line spaced by power with the carriage in any position, and without returning the carriage, is shown in Fig. 19. In this form the carriage is provided with a toothed rack 140 adjacent the escapement mechanism rack. The lever 141 is pivoted at 142 to a stationary bracket 143 and the free end of this lever is provided with teeth 144 adapted to engage the teeth of rack 140. Pivoted to the end of lever 141 is an arm 145 fixed to a shaft 146 journaled in brackets 147. Fastened to this shaft is a downwardly extending arm 148 whose lower end is pivoted to a link 149 pivoted to one arm 150 of a bell crank lever pivoted at 151 on a bracket. The other arm 152 of the bell crank is urged counterclockwise by a spring 153. The outer end of arm 152 is connected by a link 154 to a line space key lever 155 pivoted on the shaft 61. The line space lever 155 has a stud 156 projecting over the CR lever 60 so that when the line space key lever is rocked counterclockwise by depressing its key, it will carry the CR lever with it. When the line space key 155 is released the tension of spring 153 restores the line space key lever 155 and intermediate connections to the lever 141 to normal condition, thereby returning the toothed lever 141 to its normal lowered Fig. 19 position.

The CR lever is returned by the spring 67 as previously described.

When the line spacing key 155 is depressed the clutch is engaged and the motor started in the usual manner which results in moving the slide 40 to the left, as viewed in Fig. 2. But the depression of the line space key also rocks the shaft 146 counterclockwise which rocks the lever 141 to raise the teeth 144 into engagement with the rack 140 so as to block movement of the carriage. Since the carriage cannot move, the motor will disengage the clutch and open the motor switch, as previously described, but, in the meantime, the line space mechanism will have been operated.

With this form, the platen can be line spaced by power in any position of the carriage with the carriage remaining stationary in that position.

*Safety device*

The carriage return mechanism heretofore described operates to return the carriage very rapidly across the machine. This is one of the desired objects in order that as little time as possible will be wasted in the return of the carriage. To make this operation quiet and to provide other safety factors, a safety device has been provided as follows:

Because of the quick starting action when the carriage is returned by power, there may be an occasional tendency for the carriage to be thrown ahead of the slide 40, in which case the slide might oscillate relative to the carriage during the carriage return. Should this occur, the slide might operate the line spacing mechanism more than once, which is not desirable.

Accordingly, a retarding device has been provided, comprising a dashpot 160, shown in Figs. 3 and 4, and in detail in Fig. 5. This dashpot comprises a cylinder 161, the end of which is pivoted to a downward extending projection 162 of a bracket 163 attached to the paper carriage. A plunger or piston 164 works inside the cylinder and this piston is connected to a bracket 165 attached to the slide 40. In the normal position of the slide 40 the plunger 164 is at the right hand end of the cylinder (Fig. 5), and, when the slide is moved to the left, as viewed in Fig. 3, to return the carriage across the machine, the plunger is moved with it toward the left hand end of the cylinder, the air being admitted to the cylinder through vent 166. Any tendency of the slide 40 to oscillate or return to the right from its Fig. 7 position toward its original position is opposed by the plunger which, as soon as force is put on it to move it to the right, causes the ball valve 167 to close the vent 166 and retard the return of the plunger. This effectively prevents any oscillation of the slide sufficient to operate the line spacing mechanism, and insures that the latter will be operated only once for one return of the carriage.

When the carriage reaches the end of its movement and is again returned to the control of the spring drum 30 and the escapement mechanism, the slide 40 is, of course, moved toward its right hand position under the influence of the spring drum. At this time the plunger is urged toward the right hand end of the cylinder. The valve 167 tends to prevent the exit of air and thus retards return of the plunger, but does not completely block it. It allows the plunger to return slowly to its original position. The dashpot thus performs another important function in that it prevents violent action when the carriage is released from the power drive and returned to the control of the spring drum. This is where considerable noise would otherwise occur.

*Power operated case shift mechanism*

The machine is changed from one case shift position to another by power controlled by a case shift key, the arrangement being such that, when the case shift key is depressed, the motor is started and the case shift mechanism operated to shift the machine to upper case position after which the motor is stopped and the machine left in upper case condition as long as the shift key is held depressed. But, when the shift key is released, it operates to again start the motor and return the machine to its original case position.

Referring to Fig. 20, the platen 10 is supported in end pieces 170 and associated parts forming a platen carriage having rollers 171 traveling on the shiftable rail 8. The carriage is movable up and down between the adjustable stops 172 on the paper carriage side frames, there being stops on both sides of the paper carriage frame. The rail 8 is supported by vertically slidable links 173 of which there is one at each side of the machine. The lower ends of these links 173 are pivoted on studs 174 on the arms 175 of bell crank levers fixed to a shaft 176 that extends across the machine, there being a bell crank lever on each side of the machine. The other arms 177 of the bell crank levers have springs 178 connected to them which tend to balance the weight of the platen to maintain it in a floating condition. The upper ends of the arms 177 are spear pointed and spring pressed detents cooperate with these pointed ends to releasably hold the platen in the case shift position to which it is moved. These detents comprise bell crank levers 179 urged clockwise, as viewed in Fig. 20, by springs 180 and carrying rollers 181 engaging the spear pointed or cam ends of the arms 177.

When the platen is shifted to upper case position shown in Fig. 22, it is held in this position by the detents, in the manner there shown.

The links 173 supporting rail 8 are raised and lowered by power, as follows:

Pivoted on the stud 174 of the left-hand link 173 is a two arm pawl 190 having one arm 191 provided with a hooked nose 192 and another arm 193 provided with a shoulder 194 and a tail 195. Both the hooked nose and the shoulder 194 are adapted to engage the teeth of a toothed wheel 196 fixed to the shaft 26 that is rotated by the motor. The pawl 190 is urged clockwise in Fig. 20 by a spring 197, but when the spring passes below the center of stud 174, as shown in Fig. 23, the spring urges the pawl counterclockwise.

The lower end 200 of the pawl 190 has a slot in it which engages over a stud 201 on a Y-shaped member 202 which is pivoted at 203 to one arm 204 of a bell crank lever pivoted on a screw stud 205. The arm 204 carries a stud 206 positioned in the Y-shaped end of member 202. The other arm 207 of the bell crank lever is connected by a spring 208 to one end of a case shift key lever 210 pivoted at 61 and urged counterclockwise (Fig. 20) by a spring 212. The lever 210 carries a case shift key 213 (Fig. 23) on its front end. The bell crank lever 204—207 also has an abutment 214 adapted to engage a stud 215 on the end of the key lever 210.

When the machine is in lower case position, the parts normally occupy the position illustrated in Fig. 20. It will be observed that the hooked nose 192 of pawl arm 191 is out of the path of the teeth of wheel 196 and that the shoulder 194 of arm 193 is below the path of the teeth of said wheel. Accordingly, rotation of the toothed wheel will not normally affect the pawl 190.

When the case shift key 213 is depressed to move lever 210 from the full line to the dotted line position in Fig. 20, the bell crank lever 204—207 is swung clockwise. The pivot 203 causes the Y-shaped member to be swung counterclockwise until the left-hand arm, Fig. 20, of the Y-shaped member engages the stud 206, whereupon further rocking of the Y-shaped member is prevented and the continued clockwise rocking of bell crank 204—207 rocks the pawl 190 counterclockwise about stud 174 to the position of Fig. 21 where the nose 192 of the arm 191 comes into the path of the teeth of wheel 196. During the interval between the time that the right-hand arm of the Y-shaped member 202 disengages the stud 206 and the time that the left-hand arm of said Y-shaped member engages said stud 206, the spring 197 functions to prevent the nose 192 from prematurely engaging the ratchet wheel 196.

Assuming the ratchet wheel to be rotating, it then picks up the pawl 190 and carries it upward which rocks bell cranks 175—177 counterclockwise and moves links 173 upward to raise the platen to upper case position.

As the platen reaches upper case position, the nose 192 is raised above a point where it can continue in engagement with toothed wheel 196. A cam surface 217 on the edge of the pawl arm 191 engages the teeth and assists in throwing the nose 192 out of engagement with the teeth. Although the pawl arm 191 is disconnected from the toothed wheel, the platen remains in upper case position because it is releasably held by the detent 179.

As long as the case shift key is held depressed, the platen remains in upper case position.

When the case shift key is released, the key lever 210 is pulled upwardly from its full line position of Fig. 21 towards the dot and dash line position. As it moves upwardly, the bell crank lever 204—207 is rocked counterclockwise by the engagement of the stud 215 with the abutment 214. This swings the Y-shaped member 202 clockwise until it engages the stud 216 whereupon further rocking movement of the bell crank 204—207 serves to rock the pawl 190 clockwise to the position of Fig. 22, which places the shoulder 194 of the arm 193 in the path of the teeth of the ratchet wheel 196. The spring 197 functions to prevent premature engagement between the shoulder 194 and the ratchet wheel 196, the spring being in this case below the center of the stud 174. Assuming the ratchet to be rotating, it pushes the pawl arm 193 downward and the latter, in turn, rocks the bell cranks 175—177 clockwise to pull the links 173 downward. This lowers the rail 8 and the platen carriage from upper to lower case position. The arm 193 of pawl 190 moves downward until the tail 195 of the arm engages the ratchet wheel whereupon the shoulder 194 is thrown out of engagement with the ratchet wheel, as shown in Fig. 20. In the meantime, the spear point of the arm 196 has passed under the roller on spring detent 179 and the parts are then held in the position of Fig. 20.

Provision has also been made for starting and stopping the motor in connection with the case shift mechanism, as follows:

A switch is provided in the motor circuit comprising a stationary contact 220 and a movable contact 221 (Fig. 20), the latter being carried by a yoke 222. The yoke 222 is pivoted to another yoke 223 carrying a roller stud 224 on its upper end. A spring 225 urges yokes 222 and 223 in a direction tending to close the switch. But the switch is normally held open by an abutment lever 226 pivoted at its forward end at 227 on the case shift lever 210. The lever 226 is also pivoted at 228 to a link 229 pivoted at its upper end to the bell crank lever 175—177 (Fig. 20).

When the case shift key is depressed the case shift lever 210 is rocked clockwise (Fig. 20) and the abutment lever 226 is rocked counterclockwise on its pivot 228. This moves the abutment lever from the Fig. 20 position to the position of Fig. 21, where an inclined surface 230, on the end of lever 226, permits the roller 224 to move forward and the switch to close. Accordingly, when the case shift key is depressed, the motor switch is closed to start the motor and, as previously described, the pawl 190 is moved so that the nose 192 on its arm 191 comes into the path of the ratchet wheel. Accordingly, the motor is started and the platen is moved automatically by power to upper case position.

As the platen moves toward upper case position, the bell crank 175—177 rocks counterclockwise and carries the link 229 upwardly. This rocks the abutment lever 226 clockwise about its pivot 227 on the case shift lever 210 until the abutment lever occupies the position of Fig. 23 where it will be observed the switch has been opened again. In other words, as the platen is raised to upper case position, the motor switch is automatically opened and the motor stops. As long as the case shift key is held depressed this condition obtains.

When the case shift key is released, the case shift lever 210 is moved counterclockwise from its Fig. 23 position and as this occurs, the abutment lever 226 is rocked clockwise on its pivot 228 to the position of Fig. 22 which releases the switch and permits it to close again. Accordingly, release of the case shift key starts the motor again and positions the pawl 190 so that the rotation of the ratchet wheel will move the platen from upper to lower case position.

As the platen moves to lower case position again, the bell crank 175—177 is rocked clockwise and the link 229 lowered, which swings the abutment lever 226 counterclockwise about its pivot 227 on the case shift lever 210. This returns the abutment lever to its Fig. 20 position and opens the switch to stop the motor.

From this it will be observed that the motor is caused to operate only long enough to shift the platen in either direction even though the shift key is held down.

It is also noted that connection between the parts 210, 212 and 200 is such that it enables the case shift key to be depressed a considerable distance without immediately causing the movement of the platen. In other words, a time element is provided which enables the motor to be started and then causes the platen to be shifted during the final portion of the downward key stroke of the case shift key.

It is understood that the structure shown in this application is for purposes of illustration only and that variations may be made in it without departing from the spirit and scope of the invention, as defined by the appended claims.

I claim:

1. A machine of the class described having a traveling paper carriage, means operable to move said carriage across the machine in one direction, power means operable to return said carriage across the machine in the opposite direction, a disconnectible connection between said carriage and power means, and means controlled by a manipulative member and operable, upon manipulation of said member, to set up a paragraph stop and cause said power means to return the carriage into engagement with said stop, said power means having portions acting, after said carriage has been arrested by said stop, to automatically disconnect said carriage from said power means irrespective of whether or not said manipulative member is held in manipulated position.

2. A machine of the class described having a traveling paper carriage, means operable to move said carriage across the machine in one direction, power means operable to return the carriage across the machine in the opposite direction, a carriage return key and connections operable, when said key is depressed, to set said power return means into operation so that said means will continue to operate when said key is released, means automatically disabling said power return means when said carriage is arrested, and a paragraph stop controlled by said carriage return key whereby, when said key is held depressed, said carriage is arrested in paragraph position and said power means automatically disabled and whereby when said carriage return key is released immediately after being depressed said paragraph stop moves to inactive position and said carriage returns to a fully returned position and said power means is automatically disabled.

3. A machine of the class described having a traveling paper carriage, means operable to move said carriage across the machine in one direction, power means operable to return the carriage across the machine in the opposite direction, means controlled by a manipulative member operable, when said member is manipulated in one manner, to cause said power means to completely return said carriage across the machine and, when said member is manipulated in another manner, to cause said power means to return said carriage to an intermediate position.

4. A machine of the class described having a traveling paper carriage, means operable to move said carriage across the machine in one direction, power means operable to return the carriage across the machine in the opposite direction, and a carriage return key and connections operable, upon quick depression and release of said key, to cause said power means to return said carriage across said machine, said key and connections being operable also, upon said key being held depressed, to cause said power means to return said carriage to an intermediate position.

5. A machine of the class described having a traveling paper carriage, means operable to move said carriage across the machine in one direction, power means operable to return said carriage across the machine in the opposite direction, said power means including a normally inactive motor, and a carriage return key and connections operable, upon depression and quick release of said key, to start said motor and cause said power means to return said carriage completely across the machine and said motor to be stopped, said key and connections also being operable, when said key is held depressed, to start said motor and cause said power means to return said carriage to an intermediate position and said motor to be automatically stopped.

6. A machine of the class described having a traveling paper carriage, means operable to move said carriage across the machine in one direction, power means operable to return the carriage across the machine in the opposite direction, and a carriage return key and connections operable, when said key is held depressed, to cause said power means to return said carriage to an intermediate position, said key and connections also being operable, when said key is depressed and quickly released with said carriage in said intermediate position, to cause said power means to return said carriage to its completely returned position.

7. A machine of the class described having a traveling paper carriage, means operable to move said carriage across the machine in one direction, normally inactive power means operable to return said carriage across the machine in the opposite direction, and a carriage return key and connections operable, when said key is held depressed, to start said power means and cause it to return said carriage to an intermediate position where said power means is automatically rendered inactive, said key and connections also being operable, upon depression and quick release of said key with said carriage in said intermediate position, to start said power means and cause it to return said carriage to a completely returned position where said power means is again automatically rendered inactive.

8. A machine of the class described having a traveling paper carriage, means operable to move said carriage across the machine in one direction, power means operable to return said carriage across the machine in the opposite direction, said power means including a normally inactive electric motor, a carriage return key and connections operable, when said key is held depressed, to start said motor and cause said power means to return said carriage to an intermediate position and said motor to be automatically stopped, said key and connections being also operable, by depression and quick release of said key with said carriage in said intermediate position, to start said motor and cause said power means to return said carriage to a completely returned position and said motor to be automatically stopped.

9. A machine of the class described having a traveling paper carriage, a member on said carriage mounted to move relative to said carriage, means connected to said movable member operable to exert a force on it tending to move the carriage across the machine in one direction, power means connected to said member operable to move it in the opposite direction to return the carriage across the machine, means automatically transfering the pull on said member from said power means to said first named means when the carriage has been returned to a predetermined position, and a cushioning device for cushioning the movement of said member when said transfer takes place.

10. A machine of the class described having a traveling paper carriage provided with a platen movably mounted for line spacing, power return means for said carriage, means for arresting said carriage in an intermediate position during its return, means controlled by a manipulative member operable, when said member is manipulated in one manner with said carriage in said intermediate position, to cause said power means to complete the return of said carriage, and, when said member is manipulated in another manner with said carriage in said intermediate position, to cause said power means to line space said platen and said carriage to remain stationary.

11. A machine of the class described having a traveling paper carriage provided with a platen movably mounted for line spacing, power return means for said carriage, means for arresting said carriage in an intermediate position during its return, and a depressible carriage return key and connections operable, when quickly depressed and released with the carriage in said intermediate position, to cause said power means to complete the return of said carriage, and operable also, when slowly depressed, or when held depressed, to cause said power means to line space said platen and said carriage to remain stationary.

12. A machine of the class described having a traveling paper carriage provided with a platen movably mounted for line spacing, a normally inactive power means for returning said carriage across the machine, means for arresting said carriage in an intermediate position during its return, and a depressible carriage return key and connections operable, upon quick depression and release of said key when said carriage is in said intermediate position, to start said power means and cause it to completely return the carriage and, said power means to be automatically stopped, and, upon slow depression or upon holding the key depressed in said intermediate position of said carriage, to start said power means and cause it to line space said platen and automatically stop while said carriage remains in said intermediate position.

13. A machine of the class described having a traveling paper carriage provided with a platen movably mounted for line spacing, power return means for returning said carriage across the machine, and a depressible carriage return key and connections operable, upon depression and quick release of said key to cause said power means to return said carriage to a completely returned position and, upon holding said key depressed, to cause said power means to return said carriage to an intermediate position, and operable, upon a quick depression and release of said key with said carriage in said intermediate position, to complete the return of said carriage, and, upon slow depression and upon being held depressed while said carriage is in said intermediate position, to cause said power means to line space said platen and said carriage to remain in said intermediate position.

14. A machine of the class described having a traveling paper carriage provided with a platen movably mounted for line spacing, power means operable to line space said platen and return said carriage across the machine, said power means including portions acting to automatically disable it when the carriage is arrested, and means controlled by a manipulative member operable, when said member is manipulated, to set said power means into operation and hold said carriage in whatever position it may then occupy to thereby cause said power means to line space said platen and automatically disable itself.

15. A machine of the class described having a traveling paper carriage provided with a platen movably mounted for line spacing, a power return means normally operable to line space said platen and return said carriage across the machine, a disconnectible connection between said carriage and power means, means operating to automatically disconnect said carriage from said power means when said carriage is arrested, and a key and connections operable to set said power means into operation and hold said carriage in whatever position it may then occupy to thereby cause said power means to line space said platen and automatically disconnect the power means from said carriage.

16. A machine of the class described having a traveling paper carriage provided with a platen movably mounted for line spacing, power return means operable to line space said platen and return said carriage across the machine, said return means including a normally inactive motor, means operating automatically to stop said motor when said carriage is arrested, and a key and connections operable to start said motor and hold said carriage in whatever position it then occupies to thereby cause said power return means to line space said platen and automatically stop said motor.

17. A machine of the class described having a traveling paper carriage provided with a platen movably mounted for line spacing, line spacing mechanism for said platen, power means operable to quickly return said carriage across the machine, connections between said power means and said line spacing mechanism including a member having a limited movement relative to said carriage whereby, when said power means acts to return said carriage, said member moves a limited distance to operate said line spacing mechanism, and means for preventing relative oscillating movement between said member and carriage in the event the carriage moves ahead of said member while said carriage is being returned across the machine.

18. A machine of the class described having a traveling paper carriage provided with a platen movably mounted for line spacing, a line spacing mechanism for said platen, a slide on said carriage connected to said line spacing mechanism, said slide being mounted so as to have a limited movement relative to said carriage, power means connected to said slide and operable to first move said slide to operate said line spacing mechanism and to then return said carriage across the machine, and a retarding device for preventing movement of said slide relative to said carriage while the latter is being returned across the machine.

19. A machine of the class described having a traveling paper carriage, means operable to move said carriage across the machine in one direction, power means operable to return the carriage across the machine in the opposite direction to a normal right-hand position, a carriage return key and connections operable to cause said power means to return said carriage to its normal right-hand position, a paragraph stop controlled by said carriage return key and held in position by depression of said key, and means operating to automatically disable said power means when said carriage is arrested in either of its returned positions.

20. A machine of the class described having a traveling paper carriage, means operable to move said carriage across the machine in one direction, power means including a normally disconnected clutch for returning said carriage in the opposite direction, manipulative means operable by a momentary manipulation to engage said clutch so that it will remain engaged after said manipulative means has been released, and means automatically set into operation after the stoppage of said carriage to return said clutch to disconnected condition irrespective of the position of said manipulative means.

21. A machine of the class described having a traveling paper carriage, means operable to move said carriage across the machine in one direction, motor driven means for returning said carriage in the opposite direction, said motor driven means including a normally disconnected clutch and a normally open motor switch, manipulative means operable by a momentary manipulation to engage said clutch and close said switch in such a manner that they will remain in said position after said manipulative means is released, and means automatically set into operation after the stoppage of said carriage to return said clutch to disconnected condition and to open said switch irrespective of the position of said manipulative means.

22. A machine of the class described having a traveling paper carriage, means operable to move the carriage across the machine in one direction, power means operable to return said carriage in the opposite direction, said power means including a normally inactive motor and a switch for starting the same, a carriage return key operable by a momentary depression to close said switch in such a manner that it will remain closed after said key is released, and means operating automatically in response to the stoppage of said carriage to open said switch irrespective of the position of said carriage return key.

RAYMOND G. BOWER.